(12) United States Patent
Bittner et al.

(10) Patent No.: US 9,304,730 B2
(45) Date of Patent: Apr. 5, 2016

(54) DIRECT COMMUNICATION BETWEEN GPU AND FPGA COMPONENTS

(75) Inventors: Ray Bittner, Bothell, WA (US); Erik S. Ruf, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 489 days.

(21) Appl. No.: 13/593,129

(22) Filed: Aug. 23, 2012

(65) Prior Publication Data

US 2014/0055467 A1 Feb. 27, 2014

(51) Int. Cl.
G06F 13/14 (2006.01)
G06F 3/14 (2006.01)
G09G 5/36 (2006.01)

(52) U.S. Cl.
CPC ........ *G06F 3/14* (2013.01); *G09G 5/363* (2013.01); *G09G 2360/06* (2013.01); *G09G 2360/08* (2013.01)

(58) Field of Classification Search
CPC .......... G06F 3/14; G09G 5/363; G09G 5/006; G09G 5/001; G06T 1/20
USPC .................................................. 345/501–522
See application file for complete search history.

(56) References Cited

U.S. PATENT DOCUMENTS

| | | | |
|---|---|---|---|
| 6,633,296 B1 | 10/2003 | Laksono et al. | |
| 2005/0257186 A1* | 11/2005 | Zilbershlag | 716/18 |
| 2009/0189686 A1* | 7/2009 | Yamada et al. | 327/544 |
| 2009/0254683 A1* | 10/2009 | Camer et al. | 710/23 |
| 2011/0283059 A1 | 11/2011 | Govindarajan et al. | |
| 2012/0246437 A1* | 9/2012 | Radovic et al. | 711/170 |
| 2013/0194286 A1* | 8/2013 | Bourd et al. | 345/545 |
| 2013/0241938 A1* | 9/2013 | Gruber et al. | 345/501 |
| 2013/0282945 A1* | 10/2013 | Kelly et al. | 710/305 |
| 2013/0342552 A1* | 12/2013 | Apodaca | 345/543 |

FOREIGN PATENT DOCUMENTS

WO 2014/031459 2/2014

OTHER PUBLICATIONS

Goldhammer, et al., "Understanding Performance of PCI Express Systems", Retrieved Aug. 21, 2012 at <<http://www.xilinx.com/support/documentation/white_papers/wp350.pdf>>, WP350 (v1.1) Sep. 4, 2008, 18 pages.

Bittner, Ray, "Bus Mastering PCI Express in an FPGA", Retrieved Aug. 21, 2012 at <<http://research.microsoft.com/pubs/79800/bus%20mastering%20pci%20express%20in%20an%20fpga.pdf>>, Proceedings of the ACM International Symposium on Field Programmable Gate Arrays (FPGA'09), Feb. 2009, 4 pages.

Whitted, et al., "Embedded Function Composition", Retrieved Aug. 21, 2012 at <<http://research.microsoft.com/pubs/103013/2009_embedded_function_composition.pdf>>, Proceedings of the Conference on High Performance Graphics, 2009, 4 pages.

(Continued)

*Primary Examiner* — Todd Buttram
(74) *Attorney, Agent, or Firm* — Steve Wight; Sandy Swain; Micky Minhas

(57) ABSTRACT

A system may include a Graphics Processing Unit (GPU) and a Field Programmable Gate Array (FPGA). The system may further include a bus interface that is external to the FPGA, and that is configured to transfer data directly between the GPU and the FPGA without storing the data in a memory of a central processing unit (CPU) as an intermediary operation.

20 Claims, 11 Drawing Sheets

(56) References Cited

OTHER PUBLICATIONS

"OpenCL—The open standard for parallel programming of heterogeneous systems", Retrieved Aug. 21, 2012 at <<http://www.khronos.org/opencl/>>, Khronos Group, 2012, 2 pages.
"Khronos OpenCL API Registry", Retrieved Aug. 21, 2012 at <<http://www.khronos.org/registry/cl/>>, Khronos Group, 2011, 2 pages.
Wu, Qiang, et al., "The Research and Implementation of Interfacing Based on PCI Express," 9th International Conference on Electronic Measurement Instruments (ICEMI'2009), Aug. 2009, pp. 3-116-3-121.
Vedbrat, Kam, "Introducing the DirectCompute Lecture Series!", Retrieved Aug. 23, 2012 at <<http://blogs.msdn.com/b/directx/archive/2010/06/15/introducing-the-directcompute-lecture-series.aspx/>>, Microsoft Corporation, Jun. 15, 2010, 3 pages.
"NVIDIA CUDA API Reference Manual, ver. 4.2," Retrieved Aug. 23, 2012 at <<http://developer.download.nvidia.com/compute/DevZone/docs/html/C/doc/CUDA_Toolkit_Reference_Manual.pdf>>, NVidia, Apr. 2012, 593 pages.
"NVIDIA CUDA C Programming Guide, ver. 4.2," Retrieved Aug. 23, 2012 at <<http://developer.download.nvidia.com/compute/DevZone/docs/html/C/doc/CUDA_C_Programming_Guide.pdf>>, NVidia, Apr. 2012, 173 pages.
"PCI Express Base 3.0 Specification," Retrieved Aug. 23, 2012 at <<http://www.pcisig.com/specifications/pciexpress/base3/>>, PCI SIG, 1 page.
"PLDA PCIe 3.0 (XpressRICH3)," Retrieved Aug. 23, 2012 at <<http://www.plda.com/prodetail.php?pid=175>>, PLDA, 2 pages.
"XILINX PCI Express (PCIe), The High-Bandwidth Scalable Solution," Retrieved Aug. 23, 2012 at http://www.xilinx.com/technology/protocols/pciexpress.htm, XILINX, 2 pages.
"Altera PCI Express Compiler: x1, x4, and x8 MegaCore Functions," Retrieved Aug. 23, 2012 at <<http://www.altera.com/products/ip/iup/pci-express/m-alt-pcie8.html>>, ALTERA, 2 pages.
Wiltgen et al., "Bus Master Performance Demonstration Reference Design for the Xilinx Endpoint PCI Express Solutions," Retrieved Aug. 23, 2012 at <<http://www.xilinx.com/support/documentation/application_notes/xapp1052.pdf>>, XAPP1052 (v3.2) Sep. 29, 2011 (XILINX), 40 pages.
"Download Xillybus for PCIe," Retrieved Aug. 23, 2012 at <<http://xillybus.com/pcie-download>>, XILLYBUS, 1 page.
"PLDA PCIe 2.0 endpoint with DMA," Retrieved Aug. 23, 2012 at <<http://www.plda.com/prodetail.php?pid=103>>, PLDA, 3 pages.
"Northwest Logic PCI Express Solution," Retrieved Aug. 23, 2012 at <<http://nwlogic.com/products/pci-express-solution/>>, Northwest Logic, 2 pages.
"International Search Report & Written Opinion," Mailed Date: Nov. 8, 2013, Application No. PCT/US2013/055233, inventors Bittner, et al., entitled "Direct Communication Between GPU and FPGA Components", Filed Date: Aug. 16, 2013, 9 Pages.
Bittner, et al., "Direct GPU/FPGA Communication via PCI Express", In Proceedings of 41st International Conference on Parallel Processing Workshops (ICPPW '12), IEEE Computer Society, Sep. 10, 2012, pp. 135-139.
Google Search, "Direct GPU/FPGA Communication via PCI Express", Retrieved Apr. 11, 2015, Available at: https://www.google.nl/search?q=gpu+fpga+pci&biw=2048&bih=977 &sa=X7ei=bdNwUpjKCYm54wTZqYCYBA &ved=0CBoQpwUoBg&source=Int&tbs=cdr% 3A1%2Ccd_ min%3A5%2F25%2F2012%2Ccd_max%3A7%2F11%2F2012 &tbm=.
"International Preliminary Report on Patentability," Mailed Date: Feb. 24, 2015, Application No. PCT/US2013/055233, inventors Bittner, et al., entitled "Direct Communication Between GPU and FPGA Components", Filed Date: Aug. 16, 2013, 5 pages.
Bittner, Ray, "Speedy bus mastering PCI express," 22nd International Conference on Field Programmable Logic and Applications (FPL 2012), Aug. 29-31, 2012, pp. 523-526.
Chow, Chun Tak, "Architecture Exploration for Parallel Computing Systems," Transfer Report—Imperial College London, Department of Computing, Sep. 4, 2008, 56 pages.
Inta, R. et al., "The 'Chimera': An Off-The-Shelf CPU/GPGPU/FPGA Hybrid Computing Platform," International Journal of Reconfigurable Computing, vol. 2012, Article ID 241439, Jan. 2012, 10 pages.
Ahmed, Taneem, "OpenCL framework for a CPU, GPU, and FPGA Platform," A thesis submitted in conformity with the requirements for the degree of Master of Applied Science Graduate Department of Electrical and Computer Engineering University of Toronto, Dec. 1, 2012, 85 pages.
"NVIDIA GPUDirect SDK ," Retrieved Mar. 6, 2013 at <<http://www.hybriddsp.com/Products/NVIDIAGPUDirectSDK.aspx>>, 1 page.
Da Silva, et al., "Study of Combining GPU/FPGA Accelerators for High-Performance Computing," Retrieved Mar. 6, 2013 at <<http://www-labsticc.univ-ubs.fr/~chavet/orga/HLS4HPC_2013/txt/ EDH_paper.pdf>>, HLS4HPC workshop at the 9th International Conference on High-Performance and Embedded Architectures and Compilers. Jan. 21-23, 2013, p. 1-2.
Walbourn, Chuck, "DirectCompute," Retrieved Mar. 7, 2013 at <<http://blogs.msdn.com/b/chuckw/archive/2010/07/14/ directcompute.aspx>>, Jul. 14, 2010, 1 page.

* cited by examiner

DIRECT COMMUNICATION BETWEEN GPU AND FPGA COMPONENTS

BACKGROUND

Users of computing devices have been experiencing difficulties with regard to clock scaling, and developers and users have thus been exploring parallel computation in the mainstream. Multi-core central processing units (CPUs), Graphics Processing Units (GPUs), and Field Programmable Gate Arrays (FPGAs) are increasingly being used for computational needs.

SUMMARY

According to one general aspect, a system may include one or more processors located on a computing device, and at least one tangible computer-readable storage medium storing instructions executable by the one or more processors. The executable instructions may be configured to cause the computing device to obtain a virtual pointer identifying an address for directly accessing a memory of a Field Programmable Gate Array (FPGA). Further, the computing device may initiate a transmission of the virtual pointer to a Graphics Processing Unit (GPU) driver associated with a GPU that is external to the FPGA. Further, the computing device may initiate a transfer of data directly between the GPU and the FPGA via a bus interface external to the FPGA without storing the data in a memory of a central processing unit (CPU) as an intermediary operation.

According to another aspect, a request to transfer data between a Graphics Processing Unit (GPU) and a Field Programmable Gate Array (FPGA) may be initiated. The data may be transferred directly between the GPU and the FPGA via a bus interface external to the FPGA without storing the data in a memory of a central processing unit (CPU) as an intermediary operation.

According to another aspect, a system may include a Graphics Processing Unit (GPU) and a Field Programmable Gate Array (FPGA). The system may further include a bus interface that is external to the FPGA, and that is configured to transfer data directly between the GPU and the FPGA without storing the data in a memory of a central processing unit (CPU) as an intermediary operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

I. Introduction

Figure 1:
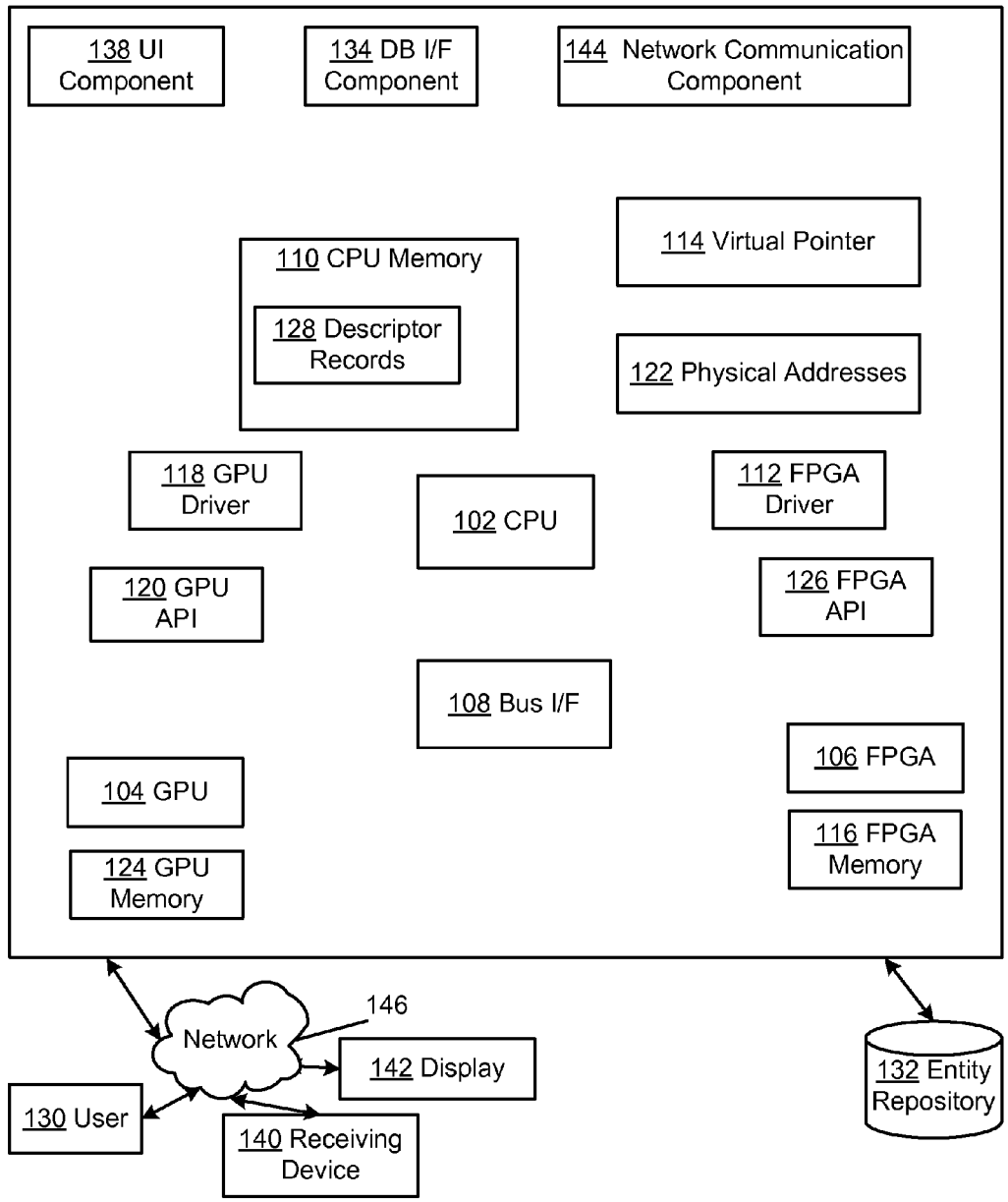
FIG. 1 is a block diagram of an example system for direct communication between GPU and FPGA components.

Multi-core central processing units (CPUs), Graphics Processing Units (GPUs), and Field Programmable Gate Arrays (FPGAs) may be employed to fill a computational gap left between clock rate and predicted performance increases. Each of these component types may provide somewhat different attributes. For example, CPUs may provide ease of programming and native floating point support with complex and cumbersome memory systems, as well as significant operating system overhead.

For example, GPUs may provide fine grain single instruction, multiple data (SIMD) processing and native floating point with a streaming memory architecture and a more difficult programming environment. For example, FPGAs may provide advantageous flexibility in processing, control and interfacing, accompanied by higher programming difficulty and lower clock rates, with somewhat cumbersome floating point support.

Graphics Processing Units (GPUs) have been used for graphics applications such as games and computer aided design for many years. More recently, GPUs have been used for other tasks such as image processing, search and other more general applications. Field Programmable Gate Arrays (FPGAs) have also been used for a variety of special purpose computing tasks. For example, although both FPGAs and GPUs may be viewed as special purpose processors, each may function better at some things than others. Thus, for example, it may be advantageous to enable a direct communication path between the two that allows each to perform the task(s) for which it is best suited, and then hand off the computational task to the other for further processing.

As another example, it may sometimes be desirable to port an algorithm from one to the other in the development process as computational, monetary or other pressures affect the desired implementation. Thus, it may be advantageous to be able to send data directly from one to the other so that the porting process may proceed incrementally, allowing the algorithm to run partially on the FPGA and partially on the GPU.

For example, this transfer may be implemented based on using a host personal computer (PC) as an intermediary stopping point for the data. However, this type of transfer may be relatively slow, more resource intensive, and may not scale to larger systems. Example techniques discussed herein may provide direct communication without having to pass through the host PC's main memory. For example, techniques for providing direct communication between FPGAs and GPUs may provide lower latency transfers, higher bandwidth transfers, and/or higher aggregate system bandwidth.

Example embodiments discussed herein may provide an ability to directly communicate between GPUs and FPGAs. For example, GPUs may directly communicate with FPGAs using PCIe (Peripheral Component Interconnect Express), or PCI Express, which is a bus interface that, for example, provides a high bandwidth connection in the PC platform.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for direct communication between GPU and FPGA components. As shown in FIG. 1, the system 100 may include one or more processors located on a computing device. The system 100 may include at least one tangible computer-readable storage medium storing instructions executable by the one or more processors. The system 100 may include at least one central processing unit (CPU) 102.

The system 100 may include a Graphics Processing Unit (GPU) 104 and a Field Programmable Gate Array (FPGA) 106. The system 100 may also include a bus interface 108 that is external to the FPGA 106, and that is configured to transfer data directly between the GPU 104 and the FPGA 106 without storing the data in a memory 110 of a central processing unit (CPU) as an intermediary operation. According to an example embodiment, the bus interface 108 may include a Peripheral Component Interconnect Express (PCIe) interface. According to an example embodiment, transferring the data may include transferring the data directly between the GPU 104 and the FPGA 106 via a PCIe switch. For example, the PCIe switch may be included in the PCIe interface.

According to an example embodiment, an FPGA driver 112 may be configured to generate a virtual pointer 114 identifying an address for directly accessing a memory 116 of the FPGA 106. For example, the memory 116 may include one or more memory devices located external to the FPGA 106, memory that may be located internally on the FPGA 106, or any combination thereof. A GPU driver 118 that is associated with the GPU 104 may be configured to obtain the virtual pointer 114 via an application programming interface (API) 120 associated with the GPU 104 that is external to the FPGA 106.

In this context, a "virtual pointer" may refer to a value that may represent an address in an electronic device. Virtual pointers may be generated as such a representation, and may be translated to one or more physical addresses (e.g., for data that may be stored in discontiguous blocks, e.g., based on a virtual memory arrangement).

The API 120 associated with the GPU 104 may be configured to generate one or more physical addresses 122 of one or more locations in the memory 116 of the FPGA, based on the virtual pointer 114.

According to an example embodiment, the data may be transferred from a memory 124 of the GPU 104 to the memory 116 of the FPGA 106, based on the one or more physical addresses 122 of the one or more locations in the memory 116 in the FPGA 106. According to an example embodiment, the data may be transferred from the memory 116 in the FPGA 106 to the memory 124 in the GPU 104, based on the one or more physical addresses 122 of the one or more locations in the memory 116 in the FPGA 106.

For example, the memory 124 may include one or more memory devices located external to the GPU 104, memory that may be located internally on the GPU 104, or any combination thereof.

According to an example embodiment, the data may be transferred from the memory 124 in the GPU 104 to the memory 116 in the FPGA 106, based on a direct memory access (DMA) transfer from the memory 124 of the GPU 104 to the memory 116 of the FPGA 106.

According to an example embodiment, the data may be transferred from the memory 116 of the FPGA 106 to the memory 124 of the GPU 104, based on a DMA transfer from the memory 116 of the FPGA 106 to the memory 124 of the GPU 104.

According to an example embodiment, the FPGA is included in the computing device as a production component. According to an example embodiment, the FPGA is included in the computing device as a prototype component According to an example embodiment, the GPU driver 118 that is associated with the GPU 104 may be configured to generate a virtual pointer 114 identifying an address for directly accessing a memory 124 of the GPU 104, wherein the GPU 104 is external to the FPGA 106. According to an example embodiment, the FPGA driver 112 that is associated with the FPGA 106 may be configured to obtain the virtual pointer 114 via an API 126 associated with the FPGA 106.

The API 126 associated with the FPGA 106 may be configured to generate one or more physical addresses 122 of one or more locations in the memory 124 of the GPU 104, based on the virtual pointer 114. For example, the data may be transferred from the memory 116 of the FPGA 106 to the memory 124 of the GPU 104, based on the one or more physical addresses 122 of the one or more locations in the memory 124 of the GPU 014.

For example, the data may be transferred from the memory 124 of the GPU 104 to the memory 116 of the FPGA 106, based on the one or more physical addresses 122 of the one or more locations in the memory 124 of the GPU 104.

According to an example embodiment, the data may be transferred from the memory 116 of the FPGA 106 to the memory 124 of the GPU 104, based on the one or more physical addresses 122 of the one or more locations in the memory 124 of the GPU 104, based on a direct memory access (DMA) transfer from the memory 116 of the FPGA 106 to the memory of the GPU 104.

According to an example embodiment, the data may be transferred from the memory 124 of the GPU 104 to the memory 116 of the FPGA 106, based on the one or more physical addresses 122 of the one or more locations in the memory 124 of the GPU 104, based on a DMA transfer from the memory 124 of the GPU 104 to the memory 116 of the FPGA 106.

According to an example embodiment, descriptor records 128 may be stored in the CPU memory 110 as part of the virtual addressing techniques discussed herein. For example, the memory 110 may include one or more memory devices located external to the CPU 102, memory that may be located internally on the CPU 102, or any combination thereof.

The system 100 may have a user 130 that may access the system 100. For example, the user 130 may enter input via a user input device.

According to an example embodiment, the system 100, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

For example, an entity repository 132 may include one or more databases, and may be accessed via a database interface component 134. One skilled in the art of data processing will appreciate that there are many techniques for storing repository information discussed herein, such as various types of database configurations (e.g., relational databases, hierarchical databases, distributed databases) and non-database configurations.

According to an example embodiment, the system 100 may include memories that may store data. In this context, a "memory" may include a single memory device or multiple memory devices configured to store data and/or instructions. Further, the memories may span multiple distributed storage devices. The memory (or one or more portions thereof) may also be included internally as part of one or more processing devices (e.g., CPU, GPU, FPGA devices).

According to an example embodiment, a user interface component 138 may manage communications between the user 130 and the system 100. The user 130 may be associated with a receiving device 140 that may be associated with a display 142 and other input/output devices. For example, the display 142 may be configured to communicate with the receiving device 140, via internal device bus communications, or via at least one network connection.

According to example embodiments, the display 142 may be implemented as a flat screen display, a print form of display, a two-dimensional display, a three-dimensional display, a static display, a moving display, sensory displays such as tactile output, audio output, and any other form of output for communicating with a user (e.g., the user 130).

According to an example embodiment, the system 100 may include a network communication component 144 that may manage network communication between the system 100 and other entities that may communicate with the system 100 via at least one network 146. For example, the network 146 may include at least one of the Internet, at least one wireless network, or at least one wired network. For example, the network 146 may include a cellular network, a radio network, or any type of network that may support transmission of data for the system 100. For example, the network communication component 144 may manage network communications between the system 100 and the receiving device 140. For example, the network communication component 144 may manage network communication between the user interface component 138 and the receiving device 140.

In this context, a "processor" may include a single processor or multiple processors configured to process instructions associated with a processing system. A processor may thus include one or more processors processing instructions in parallel and/or in a distributed manner. One skilled in the art of data processing will appreciate that processors may be implemented as a single component, and/or as distributed units which may be located internally or externally to the system 100, and/or any of its elements.

For example, the system 100 may include at least one tangible computer-readable storage medium storing instructions executable by the one or more processors, the executable instructions configured to cause at least one data processing apparatus (e.g., a computing device) to perform operations associated with various example components included in the system 100, as discussed herein. For example, the one or more processors may be included in the at least one data processing apparatus. One skilled in the art of data processing will understand that there are many configurations of processors and data processing apparatuses (e.g., computing devices) that may be configured in accordance with the discussion herein, without departing from the spirit of such discussion.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

Several GPGPU (general purpose GPU) abstractions support explicit transfers between the CPU 110 and GPU 104. Example techniques discussed herein provide transfers between the CPU 110 and the FPGA 106. Further, example techniques discussed herein may enable direct GPU-FPGA communication.

Figure 2:
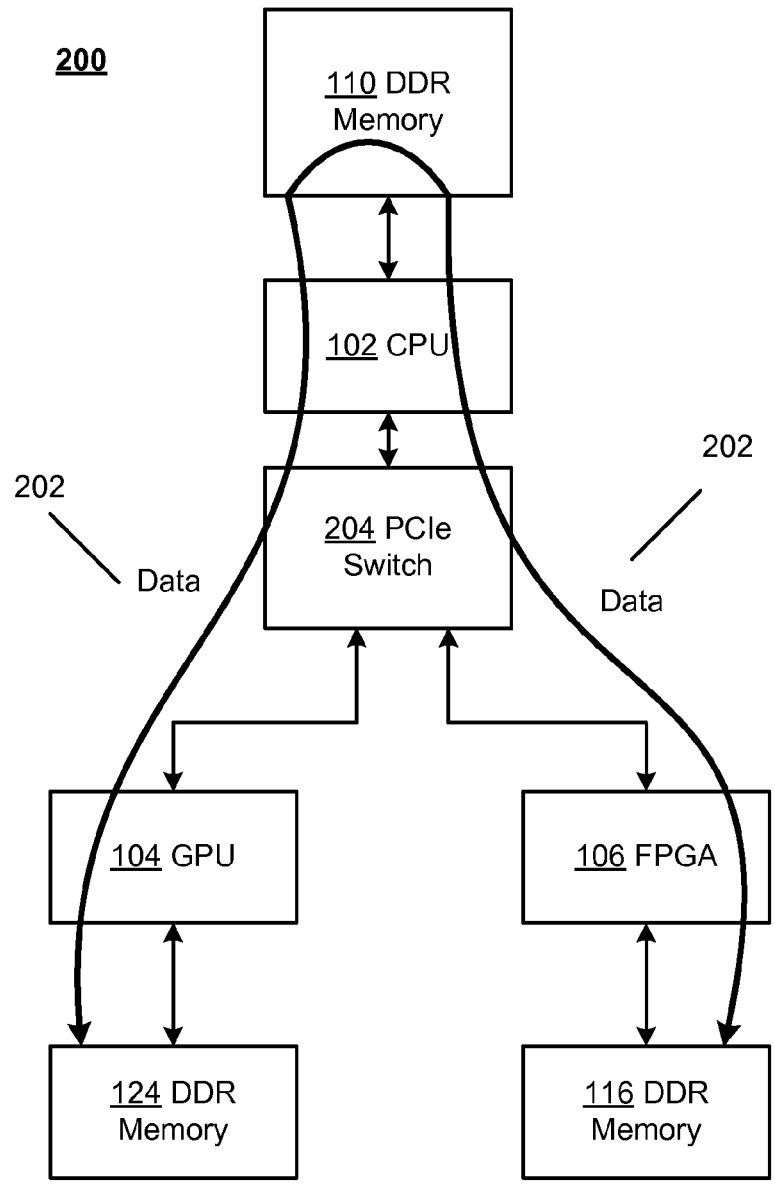
FIG. 2 is a block diagram of an example system for indirect communication between GPU and FPGA components.

For example, GPU to FPGA communication may be implemented by transferring data through CPU memory as illustrated in FIG. 2, and as discussed further below. FIG. 2 is a block diagram of an example system for indirect communication between GPU and FPGA components. As shown in FIG. 2, data 202 is transferred between the GPU memory 124 and the FPGA memory 116 via the GPU 104, a PCI Express (PCIe) switch 204, the CPU 102, the CPU memory 110, and back through the CPU 102, PCIe switch 204, the FPGA 106, to the FPGA memory 116.

Data thus traverses through the PCIe switch 204 twice and suffers the latency penalties of both the operating system and the CPU memory hardware using this indirect path, which may be referred to herein as a GPU-CPU-FPGA transfer. This additional indirection may add communication latency and operating system overhead to a computation, as well as consuming bandwidth that may otherwise be used by other cluster elements sharing the same communication network.

Figure 3:
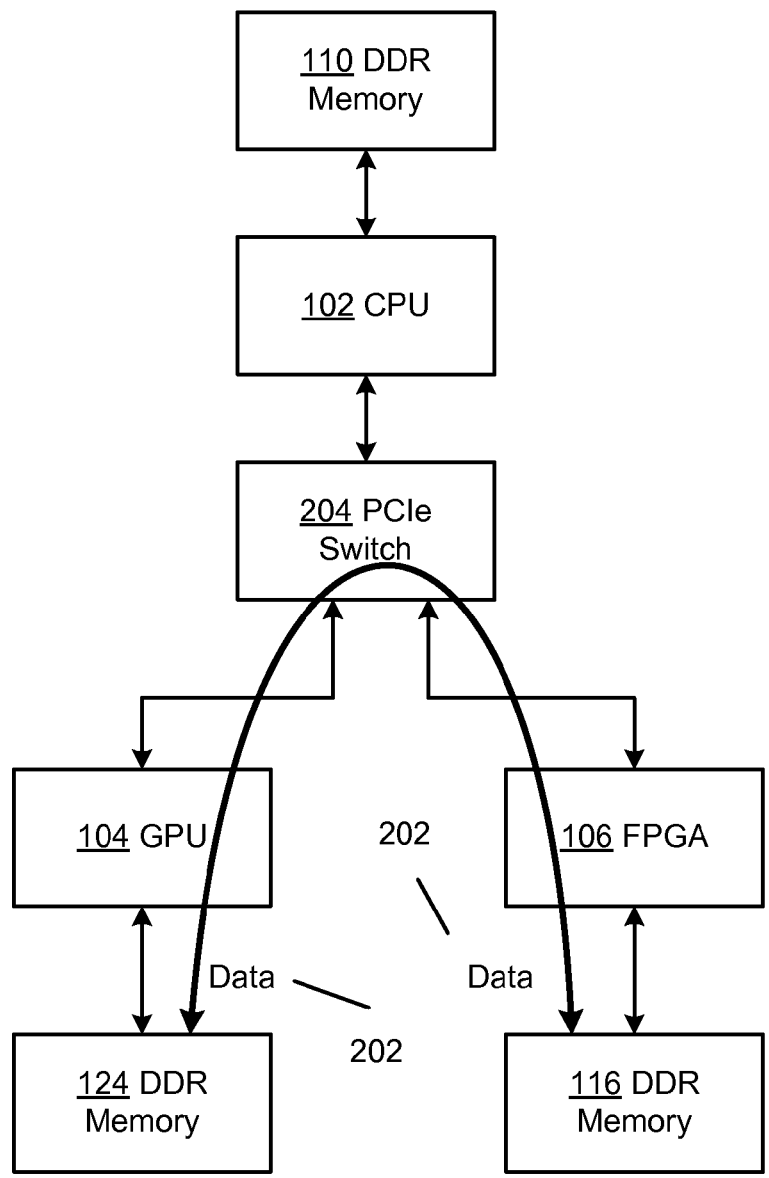
FIG. 3 is a block diagram of an example system for direct communication between GPU and FPGA components.

FIG. 3 is a block diagram of an example system for direct communication between GPU and FPGA components. According to an example embodiment, FIG. 3 may provide an overview of an example system for direct communication between GPU and FPGA components. Example embodiments discussed herein may provide direct, bidirectional GPU-FPGA communication over the PCIe bus, as shown in FIG. 3. As illustrated in FIG. 3, the data 202 moves through the PCIe switch 204 once and is not copied into system memory 110, thus enabling more efficient communication between these disparate computing elements (i.e., the GPU 104 and the FPGA 106), may be referred to herein as a direct GPU-FPGA transfer.

According to an example embodiment, a Speedy PCIe core is an FPGA core that may, for example, be used with XILINX FPGAs. For example, the Speedy PCIe core may build on XILINX PCIe IP to provide FPGA designers a memory-like interface to the PCIe bus that may abstract away the addressing, transfer size and packetization rules of PCIe. For example, a distribution may include VERILOG so that this memory interface may become a high speed DMA engine that, together with a MICROSOFT WINDOWS driver, may provide the full bandwidth potential of the PCIe bus between a PC's system memory and DDR3 (double data rate type three) that is local to the FPGA.

The Speedy PCIe design may provide minimal system impact while delivering maximum performance. Data transfers may be initiated from the CPU 102 via a single write across the PCIe bus after the setup of a number of transfer descriptor records (e.g., descriptor records 128 of FIG. 1) that are maintained in the host's system memory. Since system memory has lower latency and higher bandwidth for the CPU, this arrangement offloads work from the processor and may ultimately result in higher performance by avoiding operating system overhead.

Minimizing the number of CPU initiated reads and writes across the PCIe bus may also be helpful because in practice the execution time for a single 4 byte write is often in the range of 250 ns to 1 µs, while reads are often in the range of 1 µs to 2.5 µs. This overhead savings offered by the Speedy PCIe core may directly contribute to lower latency transfers.

On the GPU side, hardware functionality may be hidden behind an opaque, vendor-supplied driver. Such APIs may conventionally support only transfers between GPU and CPU memories, not between GPU memory and that of arbitrary devices. However, the NVIDIA Compute Unified Device Architecture (CUDA) library on the professional level QUADRO and TESLA product lines provides a peer-to-peer memory transfer facility. CUDA is a parallel computing architecture developed by NVIDIA for graphics and general purpose processing. Such a peer-to-peer memory transfer facility may enable GPU-GPU data transfers, but may not explicitly support transactions involving arbitrary PCIe devices, such as an FPGA development board. For example, the GPU may act as the bus master in any transfer in which it is involved, in such facilities.

If the GPU 104 acts as the bus master, it follows that the FPGA 106 acts as the slave in order to enable the direct GPU-FPGA data path. The FPGA 106 then maps its memory (on chip or otherwise) onto the PCIe bus so that the GPU 104 may read or write it directly as needed. This arrangement results in the master/slave relationships summarized in Table I shown below for each transfer type.

TABLE I

| Transfer | PCIe Master | PCIe Slave |
|---|---|---|
| GPU-CPU | GPU | CPU |
| FPGA-CPU | FPGA | CPU |
| GPU-FPGA | GPU | FPGA |

According to example embodiments discussed herein, various CUDA operations intended for CPU memory access may be repurposed for GPU-FPGA transfers. For example, the CUDA API may support the concept of page-locked CPU memory, which may maintain a constant physical address and can thus be efficiently accessed by the GPU's bus-mastering DMA controller. For example, CUDA may provide malloc( )-like functionality for allocating and freeing blocks of such memory. Further, CUDA may also provide a routine for pagelocking existing CPU virtual address ranges (succeeding only when the operating system has allocated physical pages for the specified virtual address range).

For example, this routine may not distinguish between virtual addresses mapped to physical CPU memory and those mapped to FPGA memory by the SpeedyPCIe driver. Furthermore, since the driver may map FPGA pages in locked mode, the CUDA locking routine does not fail on these ranges. Thus, the mapped pointer can be passed to various memcpy( )-style operators in CUDA that expect page-locked CPU memory pointers as arguments. Thus, the Speedy PCIe driver may be implemented to allow a user application to obtain a virtual pointer to the physical DDR3 mapped by the FPGA onto the PCIe bus. Using this pointer, the FPGA's DDR3 memory may be directly accessed using the standard C*ptr notation or other programmatic forms of direct manipulation. For example, this virtual memory pointer may also be passed to the CUDA page-locking and memory copy routines, causing the GPU to directly write or read data to/from the FPGA's DDR3 memory.

According to an example embodiment, the CPU is involved in the transfer, but only for initial setup, such as virtual to physical address mapping or GPU DMA configuration in the driver, but the data itself may be moved directly between the GPU and FPGA over the PCIe bus.

As an example implementation, a user may choose an NVIDIA GEFORCE GTX 580, a high-end consumer GPU that supports the CUDA 4.1 API (with the exception of peer-to-peer functionality available via the QUADRO and TESLA GPUs). This unit may make use of up to 16 generation 2.0 PCIe lanes, reaching up to 6.2 GByte/Sec of throughput. An example FPGA platform that may be used includes a XILINX ML605 development board with an integrated V6LX240T-1 XILINX FPGA. This unit supports x8 lane generation 1.0 PCIe with a maximum throughput of approximately 1.6 GByte/Sec (e.g., a factor of four slower than the GPU). Both the graphics and FPGA development boards may be plugged into a commercial PC backplane running an INTEL six core CPU and supporting PCIe generation 2.0×16.

For example, transfers between CPU and FPGA memories may be implemented by mapping FPGA memory ranges to CPU virtual memory ranges using the Speedy PCIe driver as discussed above. The virtual address ranges may then be registered with the operating system as memory-mapped files. Performing standard file system Read and Write operations on such files may induce DMA-based memory transfers between the CPU and FPGA. In this scenario, the FPGA may act as a PCIe bus master, sending or requesting data as required.

Transfers between GPU and CPU memories may be accomplished via the cudaMemcpy( ) interface. Because the CPU memory may be allocated in page-locked mode, the resulting transfers may make use of DMA, with the GPU acting as master.

Transfers between GPU and FPGA memories may be performed by first passing the FPGA memory range to cudaHostRegister( ), which makes CUDA treat the FPGA memory as page-locked CPU memory. Memory transfers may be performed using cudaMemcpy( ) in the same manner as the GPU-CPU transfers described above, with the GPU acing as the PCIe bus master.

A discussion of the speedy PCIe interface is provided below.

Figure 4:
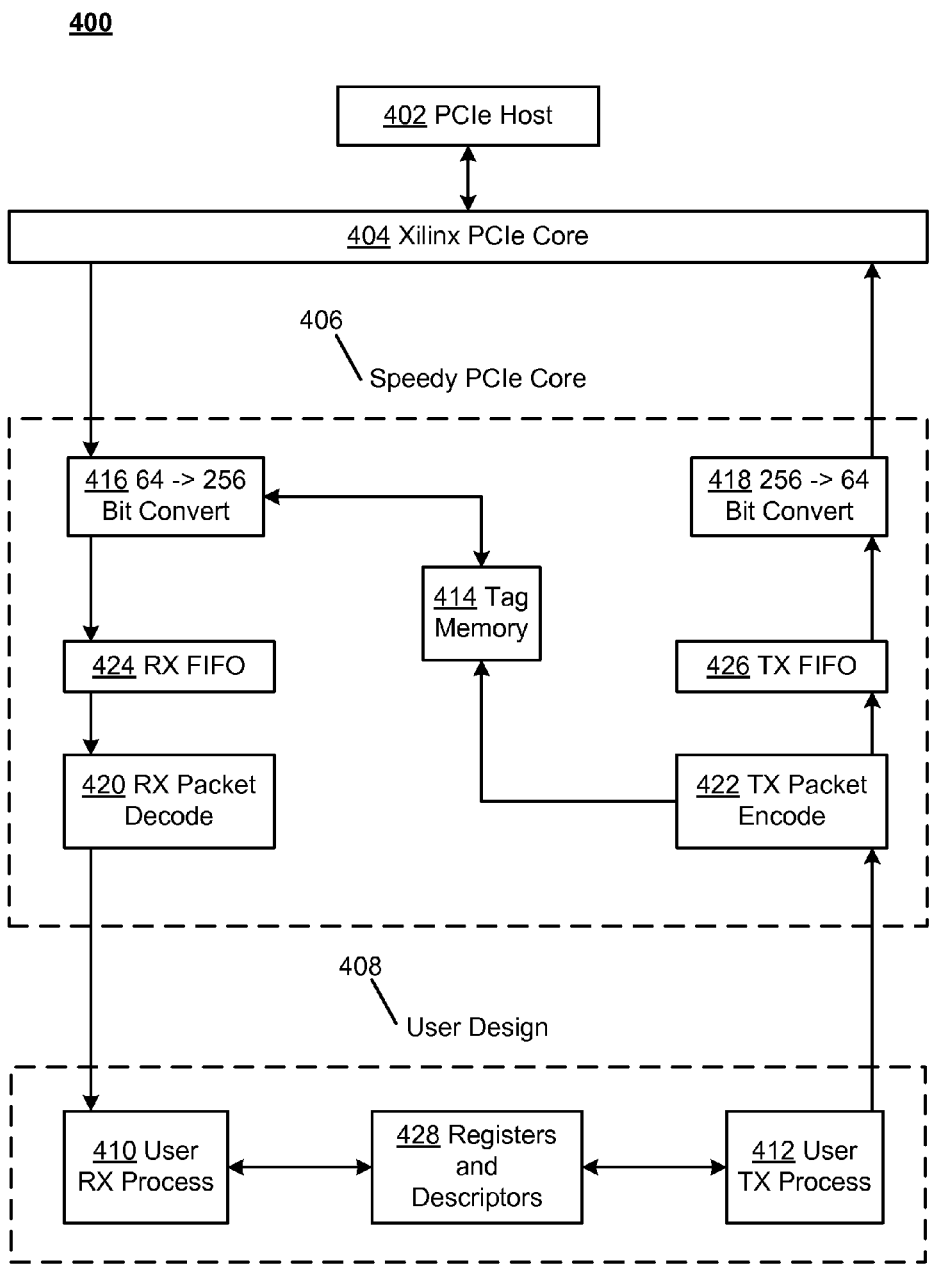
FIG. 4 is a block diagram of an example system for direct communication between GPU and FPGA components.

The PCIe core interfaces provided from XILINX and ALTERA both operate using split receive (RX) and transmit (TX) interfaces. These interfaces act independently and in parallel, though they are linked functionally, as shown in FIG. 4. For example, a Programmed I/O (PIO) read may begin with a packet on the RX interface and may be completed with one or more packets on the TX interface. Similarly, a bus mastering read operation may begin with a packet on the TX interface and may be completed with one or more packets on the RX interface.

The parallel operation of the TX and RX paths may be maintained, providing parallel state machines, each serving its respective interface. Bus master read operations are an example of this, as the Speedy Core maintains parallel master read requests outstanding on the TX interface as read data returns on the RX interface. The number of master read requests that may be in flight may be determined by the XILINX PCIe core as well as the host PC. This may be limited to 32 requests outstanding. The maximum size of master read requests may be determined by the PCIe tree's root complex and communicated to the Speedy PCIe core at BIOS POST time. In an example PCIe Gen 1.0 system, this may be 512 Bytes, with 32 requests allowed in flight at any given time, and with a read completion latency of 2.4 us. This mechanism could sustain a bandwidth of 512 Bytes*32 Requests/2.4 us=6.358 GByte/Sec if sufficient PCIe lanes were employed. In practice this number may be reduced by address boundary effects imposed by the PCIe specification.

The interrupt latency of non-real-time operating systems is variable and at times may be quite long. Interrupt latencies exceeding 1 ms may be common, which can have an effect on bus utilization/bandwidth. While the hardware interrupt response may be faster than this, the structure of common driver models may lead to meaningful activity being postponed until the multitasking scheduler can create a timeslot. The implication is that interrupts may be minimized to be as infrequent as possible, driving Speedy PCIe to use a large descriptor queue to buffer DMA scatter/gather requests for the typical 4 KByte virtual memory pages.

For example, PIO may be used to write a new DMA descriptor into the FPGA after each contiguous physical memory page as part of servicing an interrupt. However, an observed sustained bandwidth of PIO may be 2-4 MByte/Sec on test platforms. Using an example page size of 4 KBytes and minimally sized DMA descriptors of 20 bytes, a DMA data rate of 1.6 GByte/Sec for an x8 lane Gen 1.0 interface may involve a DMA descriptor transfer rate of at least 8.39 MByte/Sec.

That descriptor bandwidth can be provided by storing descriptors in system memory on the PC host where latency is lower and bandwidth is higher, and then using DMA to transfer them to the FPGA.

FIG. 4 is a block diagram of an example system for direct communication between GPU and FPGA components. As shown in FIG. 4, example blocks in a Speedy PCIe hardware design are illustrated, with a PCIe host 402. At the top is a XILINX supplied core 404, for example, with a 64-bit split RX/TX interface. A section within an upper dotted line includes a Speedy PCIe core 406 that includes connected RX and TX data paths. A lower dotted line includes a user design 408 that uses Speedy PCIe to enable a full bus mastering interface for an onboard DDR.

The Speedy PCIe core 406 may provide a memory-like interface to the user design 408. Slave read and write requests may arrive on the RX interface, which a User RX Process 410 decodes and either hands off to a User TX Process 412 or writes into the appropriate memory, respectively. Master writes may be initiated by the user TX Process 412 and may include a target PCIe address, data length and data payload. Master reads may also be initiated by the User TX Process 412, which may provide a target PCIe address, data length and a user local address to which the returned data may be written. When the return data arrives on the RX interface, that user address is returned with it (via a Tag Memory 414), so that the User RX Process 410 may simply decode and place it in the appropriate local memory in the same fashion that a slave write would be handled. The user application may not have knowledge of PCIe protocol rules, packet restrictions, etc.

For example, a native word width of the Speedy PCIe core may be 256-bits, due to the high bandwidth provided by PCIe and relatively low achievable clock rates in the FPGA. Conversion blocks 416, 418 may convert between 64-bit and 256-bit representations. For example, at a full potential bandwidth of 3.2 GByte/Sec in a x8 lane Gen 2.0 system, a minimum system clock rate may be 108 MHz using 256-bit words. After allowing some overhead cycles for data processing, this may still afford the user the ability to operate at 150-200 MHz.

The encode and decode phases (e.g., RX packet Decode 420 and TX Packet Encode 422) of the Speedy PCIe core 406 may handle the packetization of user data, ensuring that all rules of the PCIe protocol are observed. The packets traverse an RX FIFO 424 and TX FIFO 426 as illustrated in FIG. 4, while at the same time crossing clock domains. The clock rate above the FIFOs 424, 426 is dictated by a XILINX PCIe core clock as may be negotiated at runtime to be in the range of 62.5 MHz to 250 MHz. Below the FIFOs 424, 426, the Speedy PCIe core 406 may run at a clock rate of a user's choosing; further reducing a difficulty of the design task imposed on the user.

In order to combat potential interrupt and PIO effects, the driver may allocate a 1 MByte physically contiguous block of system memory from the operating system (OS) and may write a PCIe base address of this memory block to registers in the User Design 408. The memory block may be set up as a circular queue with the driver adding descriptors to the tail, and the hardware user design removing descriptors from the head. At the start of a transfer, the driver may write DMA descriptors into this buffer and may then update the tail of the circular queue in the FPGA User Design (408). The User Design 408 may then generate PCIe master read requests to pre-fetch descriptors into a Registers and Descriptors block 428 shown in FIG. 4, and may use those to initiate master reads or writes into or out of the DDR. Additional descriptors may be fetched from system memory on the fly, staying ahead of the actual data transfers. This example technique may allow the host to have a relatively large DMA descriptor buffer in system memory, potentially alleviating issues of high interrupt latency and low PIO bandwidth.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 5A:
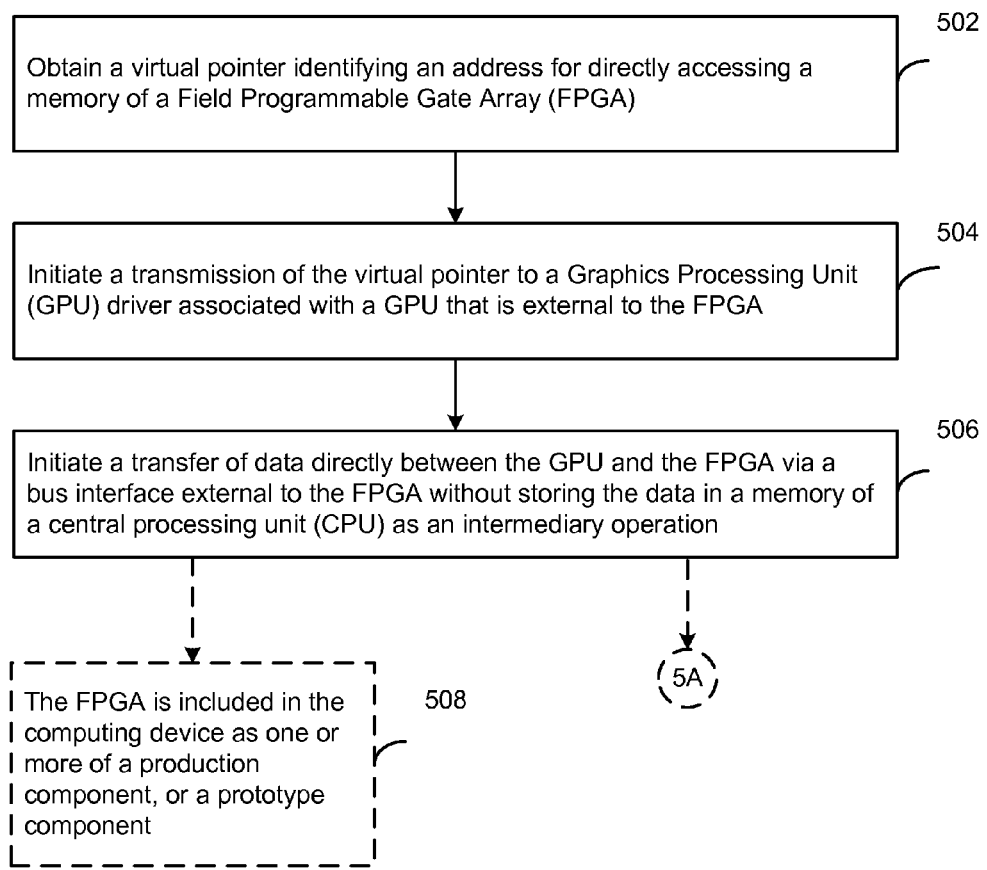
FIG. 5 is a flowchart illustrating example operations of an example system for direct communication between GPU and FPGA components.

FIG. 5 is a flowchart illustrating example operations of an example system for direct communication between GPU and FPGA components, according to example embodiments. In the example of FIG. 5a, a virtual pointer identifying an address for directly accessing a memory of a Field Programmable Gate Array (FPGA) may be obtained (502). For example, the FPGA driver 112 may generate a virtual pointer 114 identifying an address for directly accessing the memory 116 in the FPGA 106, as discussed above.

A transmission of the virtual pointer to a Graphics Processing Unit (GPU) driver associated with a GPU that is external to the FPGA may be initiated (504).

A transfer of data directly between the GPU and the FPGA may be initiated via a bus interface external to the FPGA without storing the data in a memory of a central processing unit (CPU) as an intermediary operation (506).

For example, the FPGA may be included in the computing device as a production component. For example, the FPGA may be included in the computing device as a prototype component (508).

Figure 5B:
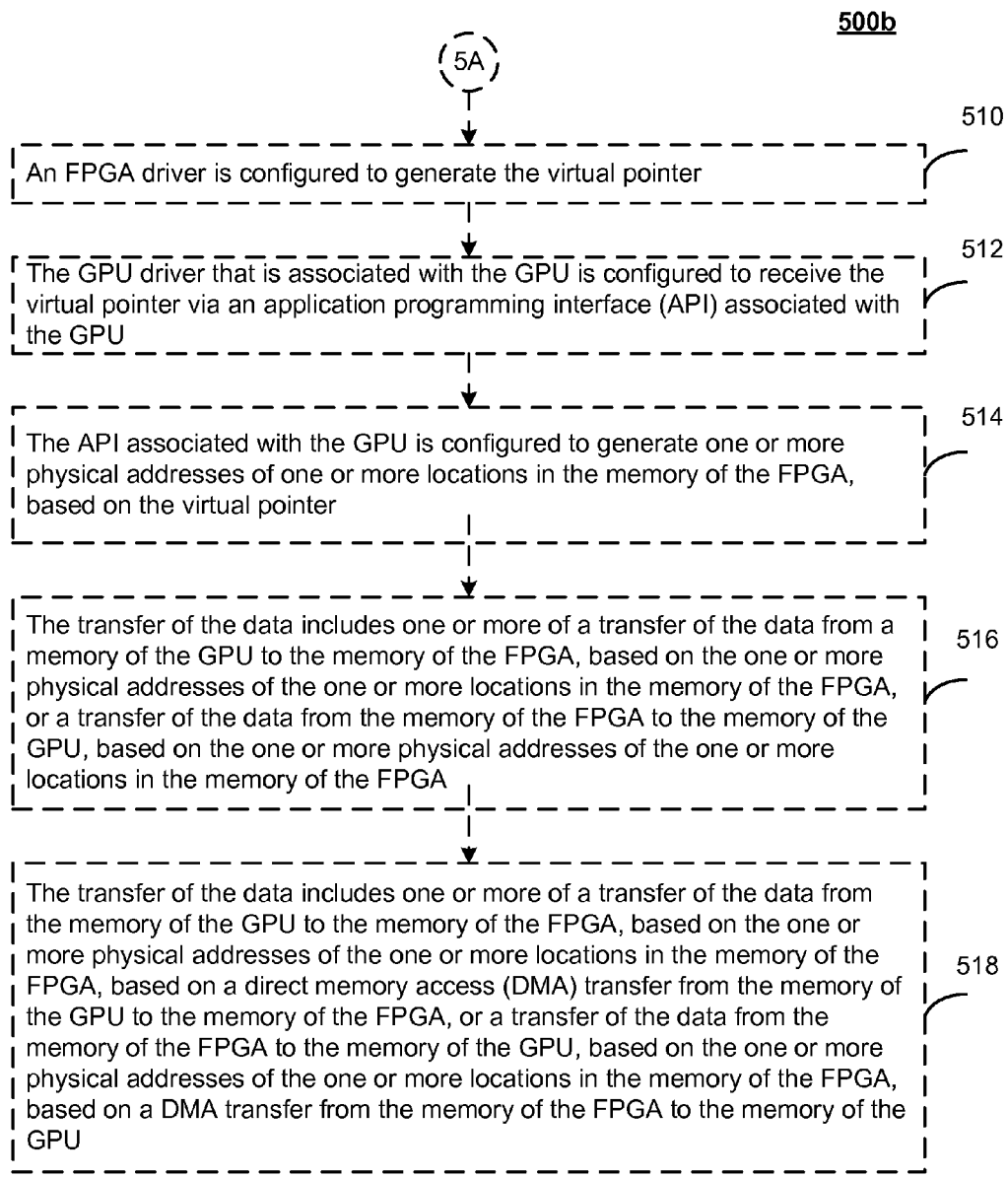

According to an example embodiment, an FPGA driver may be configured to generate the virtual pointer (510), in the example of FIG. 5b. For example, the FPGA driver 112 may generate a virtual pointer 114 identifying an address for directly accessing the memory 116 in the FPGA 106, as discussed above. The GPU driver that is associated with the GPU may be configured to receive the virtual pointer via an application programming interface (API) associated with the GPU (512). The API associated with the GPU may be configured to generate one or more physical addresses of one or more locations in the memory of the FPGA, based on the virtual pointer (514). For example, the API 120 associated with the GPU 104 may be configured to generate one or more physical addresses 122 of one or more locations in the memory 116 in the FPGA, based on the virtual pointer 114, as discussed above.

The transfer of the data may include one or more of a transfer of the data from a memory of the GPU to the memory of the FPGA, based on the one or more physical addresses of the one or more locations in the memory of the FPGA, or a transfer of the data from the memory of the FPGA to the memory of the GPU, based on the one or more physical addresses of the one or more locations in the memory of the FPGA (516).

For example, the transfer of the data may include one or more of a transfer of the data from the memory of the GPU to the memory of the FPGA, based on the one or more physical addresses of the one or more locations in the memory of the FPGA, based on a direct memory access (DMA) transfer from the memory of the GPU to the memory of the FPGA, or a transfer of the data from the memory of the FPGA to the memory of the GPU, based on the one or more physical addresses of the one or more locations in the memory of the FPGA, based on a DMA transfer from the memory of the FPGA to the memory of the GPU (518).

Figure 6A:
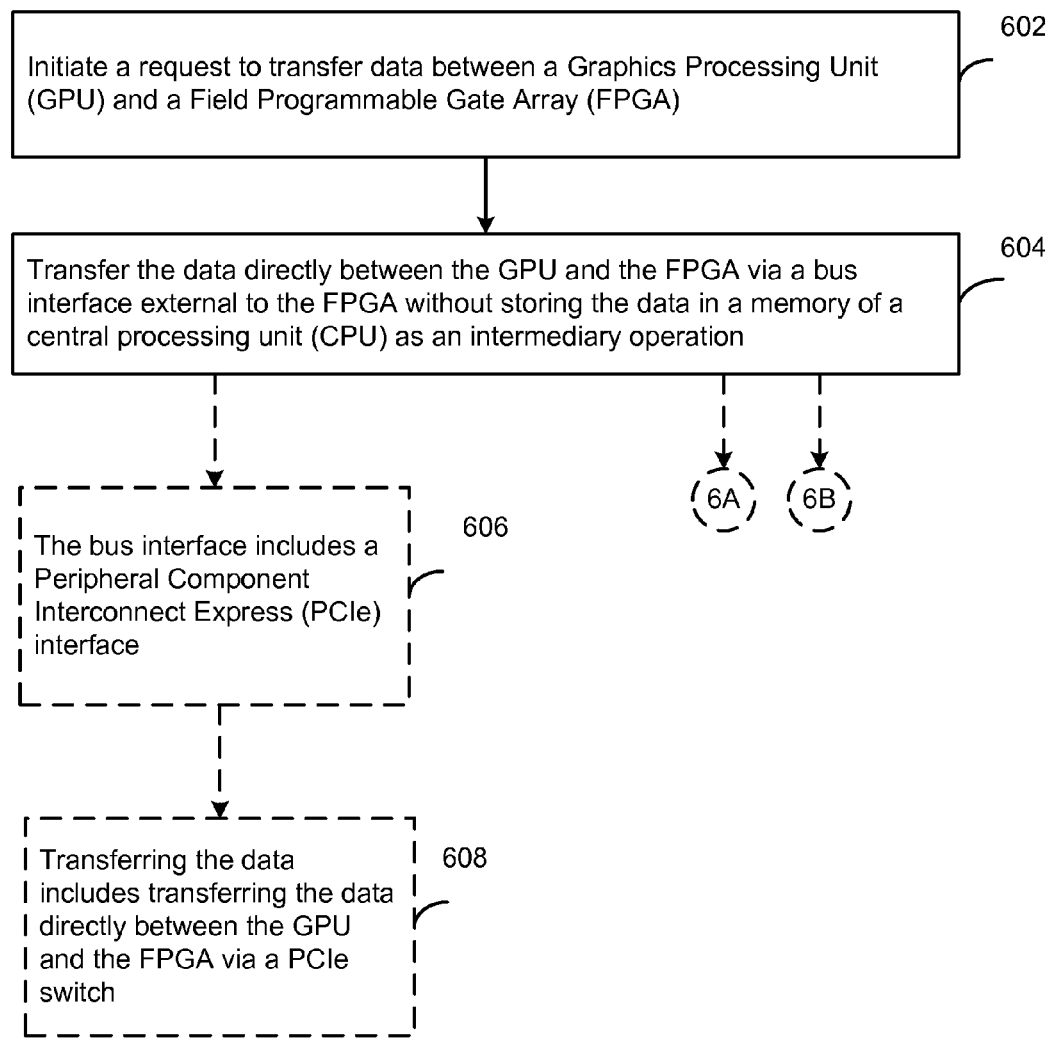
FIG. 6 is a flowchart illustrating example operations of an example system for direct communication between GPU and FPGA components.

FIG. 6 is a flowchart illustrating example operations of an example system for direct communication between GPU and FPGA components, according to example embodiments. In the example of FIG. 6*a*, a request to transfer data between a Graphics Processing Unit (GPU) and a Field Programmable Gate Array (FPGA) may be initiated (602). The data may be transferred directly between the GPU and the FPGA via a bus interface external to the FPGA without storing the data in a memory of a central processing unit (CPU) as an intermediary operation (604), as discussed above.

For example, the bus interface may include a Peripheral Component Interconnect Express (PCIe) interface (606). For example, transferring the data may include transferring the data directly between the GPU and the FPGA via a PCIe switch (608).

Figure 6B:
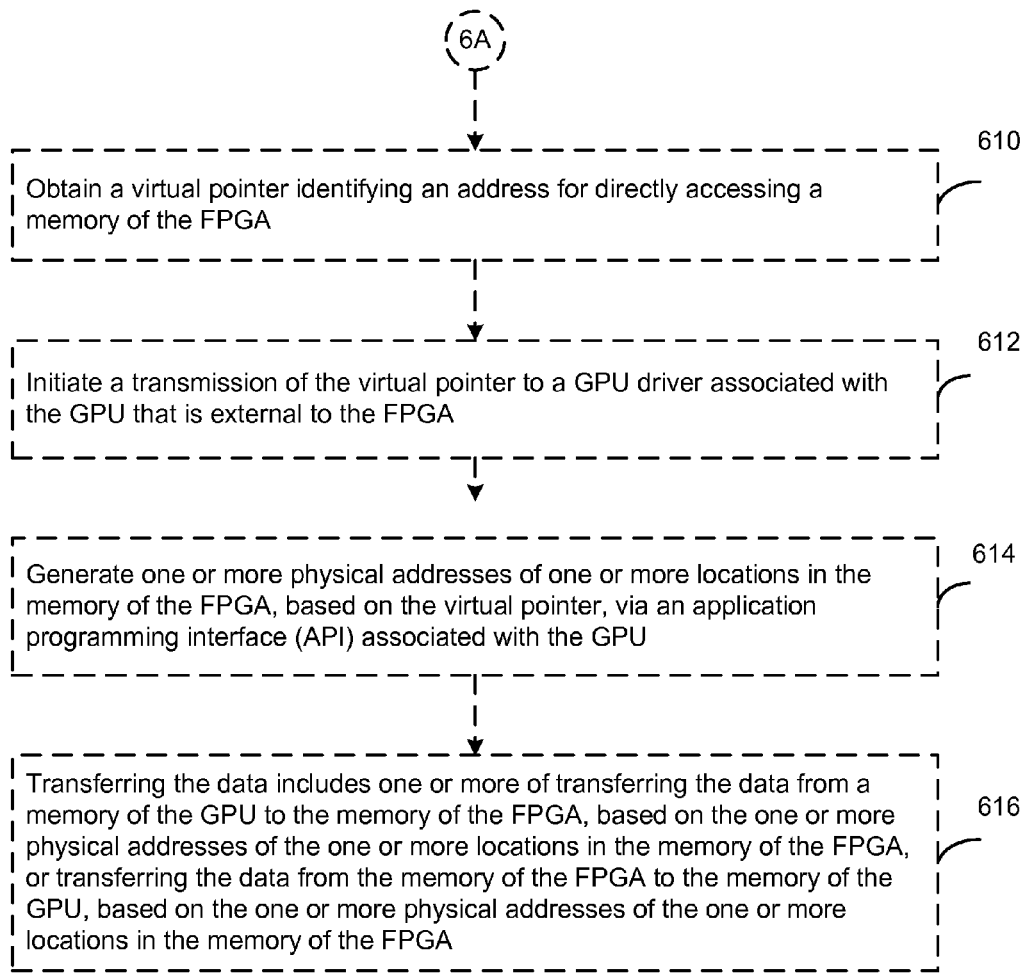

According to an example embodiment, a virtual pointer identifying an address for directly accessing a memory of the FPGA may be obtained (610), in the example of FIG. 6*b*. The virtual pointer may be transmitted to a GPU driver associated with the GPU that is external to the FPGA (612). One or more physical addresses of one or more locations in the memory of the FPGA may be generated, based on the virtual pointer, via an application programming interface (API) associated with the GPU (614).

For example, the data may be transferred from a memory of the GPU to the memory of the FPGA, based on the one or more physical addresses of the one or more locations in the memory of the FPGA. For example, the data may be transferred from the memory of the FPGA to the memory of the GPU, based on the one or more physical addresses of the one or more locations in the memory of the FPGA (616).

Figure 6C:
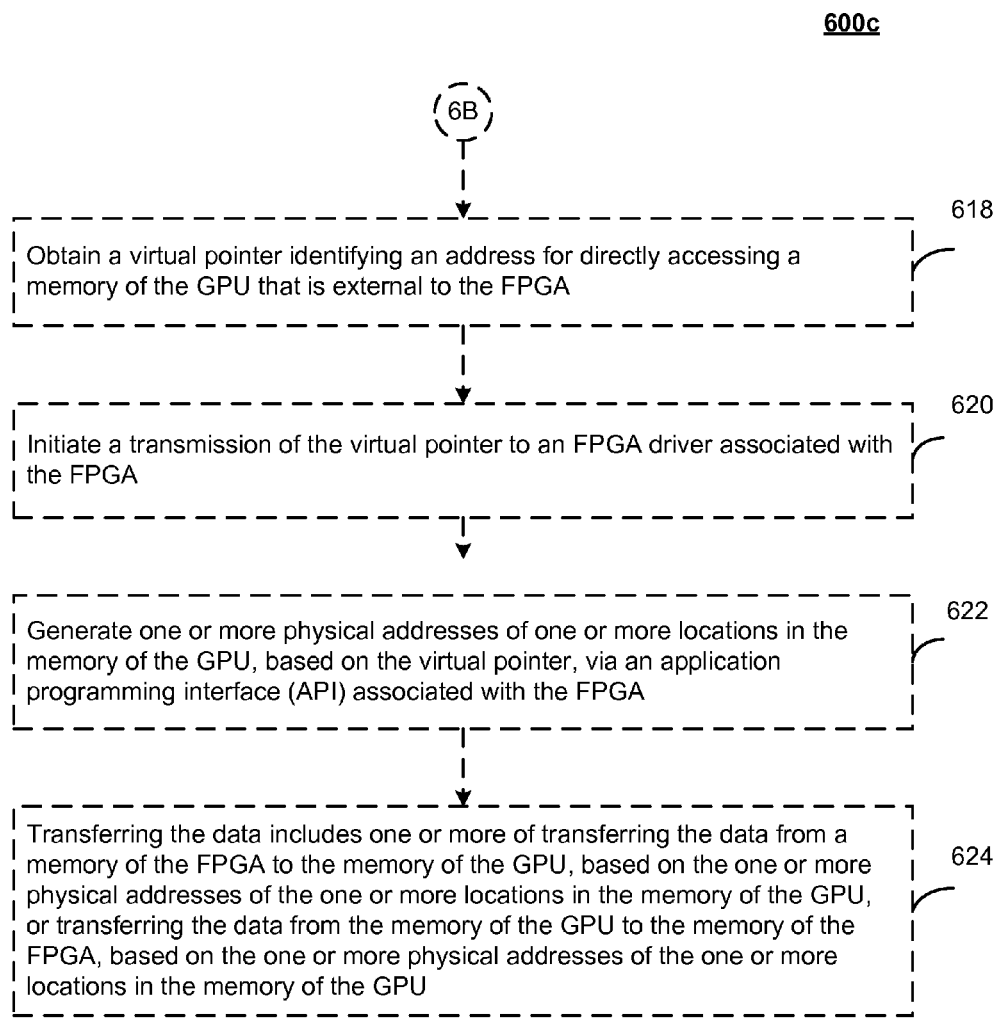

According to an example embodiment, a virtual pointer may be obtained that identifies an address for directly accessing a memory of the GPU that is external to the FPGA (618), in the example of FIG. 6*c*. The virtual pointer may be transmitted to an FPGA driver associated with the FPGA (620).

An application programming interface (API) associated with the FPGA may generate one or more physical addresses of one or more locations in the memory of the GPU, based on the virtual pointer (622).

For example, the data may be transferred from a memory of the FPGA to the memory of the GPU, based on the one or more physical addresses of the one or more locations in the memory of the GPU. For example, the data may be transferred from the memory of the GPU to the memory of the FPGA, based on the one or more physical addresses of the one or more locations in the memory of the GPU (624).

Figure 7A:
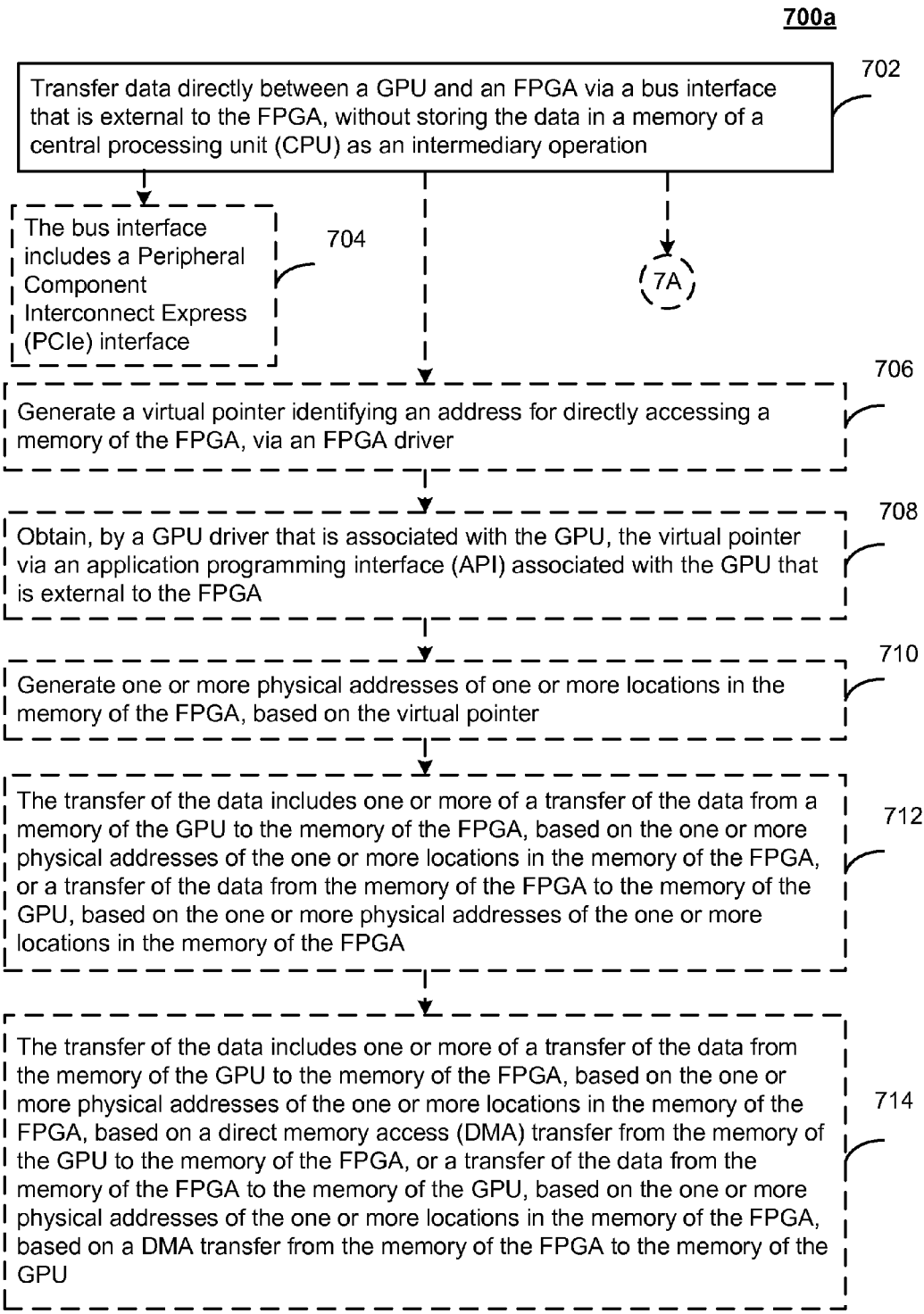
FIG. 7 is a flowchart illustrating example operations of an example system for direct communication between GPU and FPGA components.

FIG. 7 is a flowchart illustrating example operations of an example system for direct communication between GPU and FPGA components, according to example embodiments. In the example of FIG. 7*a*, data may be transferred directly between a GPU and an FPGA via a bus interface that is external to the FPGA, without storing the data in a memory of a central processing unit (CPU) as an intermediary operation (702). For example, the bus interface may include a Peripheral Component Interconnect Express (PCIe) interface (704).

An FPGA driver may generate a virtual pointer identifying an address for directly accessing a memory of the FPGA (706). A GPU driver that is associated with the GPU may obtain the virtual pointer via an application programming interface (API) associated with the GPU that is external to the FPGA (708).

One or more physical addresses of one or more locations in the memory of the FPGA may be generated, based on the virtual pointer (710).

For example, the data may be transferred from a memory of the GPU to the memory of the FPGA, based on the one or more physical addresses of the one or more locations in the memory of the FPGA. For example, the data may be transferred from the memory of the FPGA to the memory of the GPU, based on the one or more physical addresses of the one or more locations in the memory of the FPGA (712).

For example, the data may be transferred from the memory of the GPU to the memory of the FPGA, based on the one or more physical addresses of the one or more locations in the memory of the FPGA, based on a direct memory access (DMA) transfer from the memory of the GPU to the memory of the FPGA. For example, the data may be transferred from the memory of the FPGA to the memory of the GPU, based on the one or more physical addresses of the one or more locations in the memory of the FPGA, based on a DMA transfer from the memory of the FPGA to the memory of the GPU (714).

Figure 7B:
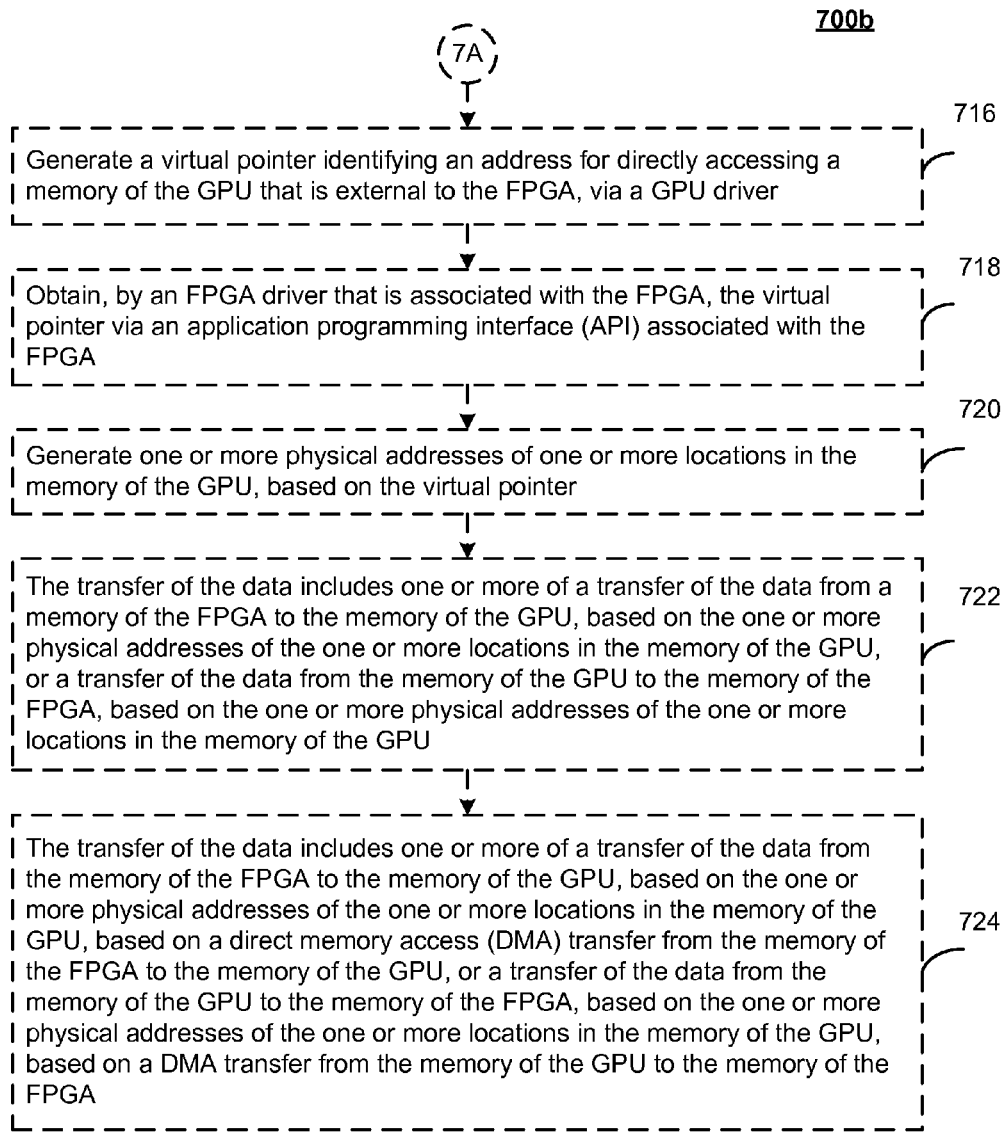

According to an example embodiment, a GPU driver that is associated with the GPU may generate a virtual pointer identifying an address for directly accessing a memory of the GPU that is external to the FPGA (716), in the example of FIG. 7*b*. An FPGA driver that is associated with the FPGA may obtain the virtual pointer via an API associated with the FPGA (718).

The API associated with the FPGA may generate one or more physical addresses of one or more locations in the memory of the GPU, based on the virtual pointer (720).

For example, the data may be transferred from a memory of the FPGA to the memory of the GPU, based on the one or more physical addresses of the one or more locations in the memory of the GPU. For example, the data may be transferred from the memory of the GPU to the memory of the FPGA, based on the one or more physical addresses of the one or more locations in the memory of the GPU (722).

For example, the data may be transferred from the memory of the FPGA to the memory of the GPU, based on the one or more physical addresses of the one or more locations in the memory of the GPU, based on a direct memory access (DMA) transfer from the memory of the FPGA to the memory of the GPU. For example, the data may be transferred from the memory of the GPU to the memory of the FPGA, based on the one or more physical addresses of the one or more locations in the memory of the GPU, based on a DMA transfer from the memory of the GPU to the memory of the FPGA (724).

One skilled in the art of data processing will understand that there are many ways of providing direct communication between a GPU and an FPGA, without departing from the spirit of the discussion herein.

Customer privacy and confidentiality have been ongoing considerations in computing environments for many years. Thus, example techniques for providing direct communication between a GPU and an FPGA may use user input and/or data provided by users who have provided permission via one or more subscription agreements (e.g., "Terms of Service" (TOS) agreements) with associated applications or services associated with processors. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality). Implementations may be implemented as a computer program embodied in a propagated signal or, alternatively, as a computer program product, i.e., a computer program tangibly embodied in an information carrier, e.g., in a machine usable or tangible machine readable storage device (e.g., a magnetic or digital medium such as a Universal Serial Bus (USB) storage device, a tape, hard disk drive, compact disk, digital video disk (DVD), etc.), for execution by, or to control the operation of, a data processing apparatus, e.g., a programmable processor, a computer, or multiple computers. A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   one or more processors located on a computing device;
   at least one tangible computer-readable storage medium storing instructions executable by the one or more processors, the executable instructions configured to cause the computing device to:
   obtain a virtual pointer identifying an address for directly accessing a memory of a Field Programmable Gate Array (FPGA);
   initiate a transmission of the virtual pointer to a Graphics Processing Unit (GPU) driver associated with a GPU that is external to the FPGA; and
   initiate a transfer of data directly between the GPU and the FPGA via a bus interface external to the FPGA without storing the data in a memory of a central processing unit (CPU) as an intermediary operation.

2. The system of claim 1, wherein:
   an FPGA driver is configured to generate the virtual pointer; and
   the GPU driver that is associated with the GPU is configured to receive the virtual pointer via an application programming interface (API) associated with the GPU.

3. The system of claim 2, wherein:
   the API associated with the GPU is configured to generate one or more physical addresses of one or more locations in the memory of the FPGA, based on the virtual pointer; and
   the transfer of the data includes one or more of:
   a transfer of the data from a memory of the GPU to the memory of the FPGA, based on the one or more physical addresses of the one or more locations in the memory of the FPGA, or
   a transfer of the data from the memory of the FPGA to the memory of the GPU, based on the one or more physical addresses of the one or more locations in the memory of the FPGA.

4. The system of claim 3, wherein:
   the transfer of the data includes one or more of:
   a transfer of the data from the memory of the GPU to the memory of the FPGA, based on the one or more physical addresses of the one or more locations in the memory of the FPGA, based on a direct memory access (DMA) transfer from the memory of the GPU to the memory of the FPGA, or
   a transfer of the data from the memory of the FPGA to the memory of the GPU, based on the one or more physical addresses of the one or more locations in the memory of the FPGA, based on a DMA transfer from the memory of the FPGA to the memory of the GPU.

5. The system of claim 1, wherein:
   the FPGA is included in the computing device as one or more of:
   a production component, or
   a prototype component.

6. A method comprising:
   initiating a request to transfer data between a Graphics Processing Unit (GPU) and a Field Programmable Gate Array (FPGA); and
   transferring the data directly between the GPU and the FPGA via a bus interface external to the FPGA without storing the data in a memory of a central processing unit (CPU) as an intermediary operation.

7. The method of claim 6, wherein:
   the bus interface includes a Peripheral Component Interconnect Express (PCIe) interface.

8. The method of claim 7, wherein:
   transferring the data includes transferring the data directly between the GPU and the FPGA via a PCIe switch.

9. The method of claim 6, further comprising:
   obtaining a virtual pointer identifying an address for directly accessing a memory of the FPGA; and
   initiating a transmission of the virtual pointer to a GPU driver associated with the GPU that is external to the FPGA.

10. The method of claim 9, further comprising:
    generating one or more physical addresses of one or more locations in the memory of the FPGA, based on the virtual pointer, via an application programming interface (API) associated with the GPU, wherein:
    transferring the data includes one or more of:
    transferring the data from a memory of the GPU to the memory of the FPGA, based on the one or more physical addresses of the one or more locations in the memory of the FPGA, or
    transferring the data from the memory of the FPGA to the memory of the GPU, based on the one or more physical addresses of the one or more locations in the memory of the FPGA.

11. The method of claim 6, further comprising:
    obtaining a virtual pointer identifying an address for directly accessing a memory of the GPU that is external to the FPGA; and
    initiating a transmission of the virtual pointer to an FPGA driver associated with the FPGA.

12. The method of claim 11, further comprising:
    generating one or more physical addresses of one or more locations in the memory of the GPU, based on the virtual pointer, via an application programming interface (API) associated with the FPGA, wherein:
    transferring the data includes one or more of:
    transferring the data from a memory of the FPGA to the memory of the GPU, based on the one or more physical addresses of the one or more locations in the memory of the GPU, or
    transferring the data from the memory of the GPU to the memory of the FPGA, based on the one or more physical addresses of the one or more locations in the memory of the GPU.

13. A system comprising:
    a Graphics Processing Unit (GPU);
    a Field Programmable Gate Array (FPGA); and
    a bus interface that is external to the FPGA, and that is configured to transfer data directly between the GPU and the FPGA without storing the data in a memory of a central processing unit (CPU) as an intermediary operation.

14. The system of claim 13, wherein:
    the bus interface includes a Peripheral Component Interconnect Express (PCIe) interface.

15. The system of claim 13, further comprising:
an FPGA driver configured to generate a virtual pointer identifying an address for directly accessing a memory of the FPGA; and
a GPU driver that is associated with the GPU and that is configured to obtain the virtual pointer via an application programming interface (API) associated with the GPU that is external to the FPGA.

16. The system of claim 15, wherein:
the API associated with the GPU is configured to generate one or more physical addresses of one or more locations in the memory of the FPGA, based on the virtual pointer; and
the transfer of the data includes one or more of:
   a transfer of the data from a memory of the GPU to the memory of the FPGA, based on the one or more physical addresses of the one or more locations in the memory of the FPGA, or
   a transfer of the data from the memory of the FPGA to the memory of the GPU, based on the one or more physical addresses of the one or more locations in the memory of the FPGA.

17. The system of claim 16, wherein:
the transfer of the data includes one or more of:
   a transfer of the data from the memory of the GPU to the memory of the FPGA, based on the one or more physical addresses of the one or more locations in the memory of the FPGA, based on a direct memory access (DMA) transfer from the memory of the GPU to the memory of the FPGA, or
   a transfer of the data from the memory of the FPGA to the memory of the GPU, based on the one or more physical addresses of the one or more locations in the memory of the FPGA, based on a DMA transfer from the memory of the FPGA to the memory of the GPU.

18. The system of claim 13, further comprising:
a GPU driver that is associated with the GPU and that is configured to generate a virtual pointer identifying an address for directly accessing a memory of the GPU that is external to the FPGA; and
an FPGA driver that is associated with the FPGA and that is configured to obtain the virtual pointer via an API associated with the FPGA.

19. The system of claim 18, wherein:
the API associated with the FPGA is configured to generate one or more physical addresses of one or more locations in the memory of the GPU, based on the virtual pointer; and
the transfer of the data includes one or more of:
   a transfer of the data from a memory of the FPGA to the memory of the GPU, based on the one or more physical addresses of the one or more locations in the memory of the GPU, or
   a transfer of the data from the memory of the GPU to the memory of the FPGA, based on the one or more physical addresses of the one or more locations in the memory of the GPU.

20. The system of claim 19, wherein:
the transfer of the data includes one or more of:
   a transfer of the data from the memory of the FPGA to the memory of the GPU, based on the one or more physical addresses of the one or more locations in the memory of the GPU, based on a direct memory access (DMA) transfer from the memory of the FPGA to the memory of the GPU, or
   a transfer of the data from the memory of the GPU to the memory of the FPGA, based on the one or more physical addresses of the one or more locations in the memory of the GPU, based on a DMA transfer from the memory of the GPU to the memory of the FPGA.

* * * * *